Dec. 11, 1934.   A. F. BERGQUIST   1,983,836
WASHING MACHINE
Filed Sept. 29, 1933
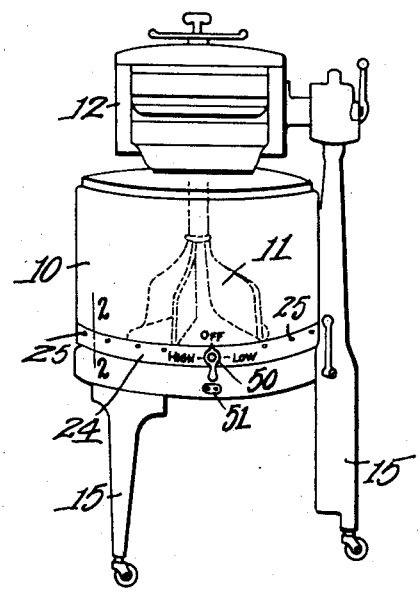
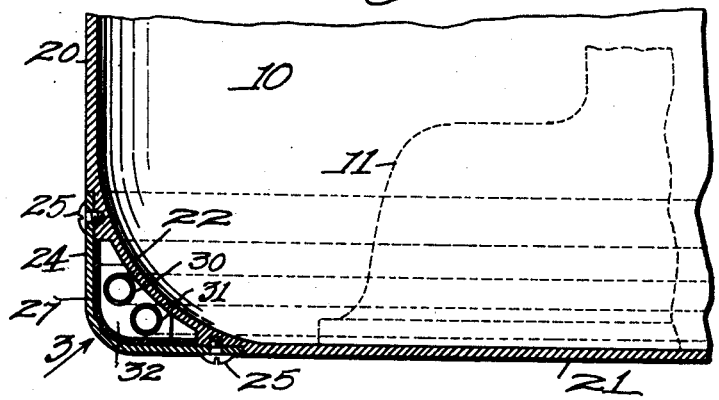
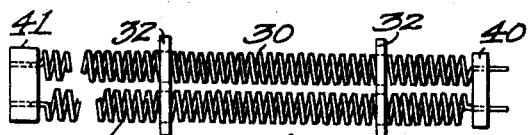
Inventor.
Anna F. Bergquist.
By attorneys
Southgate Fry & Hawley

Patented Dec. 11, 1934

1,983,836

UNITED STATES PATENT OFFICE 1,983,836

WASHING MACHINE

Anna F. Bergquist, Gardner, Mass.

Application September 29, 1933, Serial No. 691,439

4 Claims. (Cl. 219—38)

This invention relates to washing machines of the type commonly used for domestic purposes. Such machines contain only a comparatively small quantity of water when in use, and this small quantity of water quickly loses its heat during the washing operation.

It is desirable that the water be maintained at a relatively high temperature and also that the water be raised at times to the boiling point for scalding or sterilizing.

It is the general object of my invention to provide an improved construction in a domestic washing machine by which the water in the machine may be readily heated while the machine is in use and may be caused to actually boil when desired.

I also provide means by which the period of application of heat and the degree of heat may be readily controlled.

In the preferred form of my invention, I provide a heating device in the form of an electric heating unit, together with suitable means for connecting or disconnecting the unit and for varying the heating capacity thereof.

My invention further relates to arrangements and combinations of parts which will be hereinafter described and more particularly pointed out in the appended claims.

A preferred form of the invention is shown in the drawing, in which

Fig. 1 is a front view of a washing machine embodying my improvements;

Fig. 2 is an enlarged detail sectional view, taken along the line 2—2 in Fig. 1, and Fig. 3 is a side view of one section of heating units, looking in the direction of the arrow 3 in Fig. 2.

Referring to the drawing, I have shown a usual type of washing machine having an upright cylindrical container or receptacle 10, an agitator 11 mounted for operative movement therein, a wringer 12 and driving mechanism therefor, not shown in detail but which may be of any usual commercial form.

The machine is supported upon a plurality of depending legs 15 and the receptacle 10 preferably comprises a cylindrical upright side wall 20, a substantially flat bottom 21 and an outwardly convex rounded corner portion 22 interposed between the lower part of the cylindrical side wall 20 and the bottom 21.

In the preferred form of my invention, I provide an electric heating device mounted adjacent and outside of the rounded corner portion 22, as clearly shown in Fig. 2. The heating units are preferably enclosed and protected by a cover plate 24 which may be secured to the receptacle 10 by screws 25, and which is readily removable to provide access to the heating units. A layer 27 of insulating material is preferably provided inside of the cover plate 24, so that useless outward radiation of the heat developed by the heating units will be prevented.

The electric heating device may be of any usual or desired construction and is indicated somewhat diagrammatically in the drawing by heating coils 30 and 31, preferably mounted in spaced non-conducting brackets or supports 32. These supports 32 are mounted between the rounded corner portion 22 and the cover plate 24 and hold the coils 30 and 31 in spaced relation and out of contact with the portion 22 of the receptacle 10.

In order that the parts may be easily assembled or removed for repair or replacement, I preferably form the heating device in separate units, each extending around a portion only of the receptacle and each provided with an attachment plug 40 at one end and with a receptacle 41 at the other end.

As thus constructed, two heating units may be placed about the receptacle 10 and may be conveniently assembled by inserting the plug of each unit into the receptacle of the other unit. The assembled units are then retained in position by application of the cover plate 24 and are thoroughly protected from moisture or injury by said cover plate.

At a suitable point in one of the electric units a switch 50 and outlet 51 may be connected into the circuit in such manner that a flexible cable may be readily plugged in, the arrangement being such that the circuit may be broken or may be completed through one or both of the heating coils 30 and 31 as desired.

The switch 50 and the connections thereof to the heating coils form in themselves no part of my invention, and are not shown in detail as they may be of any usual commercial form such as is commonly used on electric ranges.

Having described the details of construction of my improved washing machine, the operation thereof will be readily apparent. When it is desired to maintain the temperature of the water in the washing machine during a washing operation, the switch 50 may be turned to the "low" point, thus utilizing one heating coil to supply a moderate heat which is readily transferred through the corner portion 22 of the receptacle 10 to the water in contact therewith. If more heat is desired for a boiling, scalding or sterilizing action, the switch 50 is turned to the "high" point, bringing both coils 30 and 31 into action and providing a very efficient application of substantially higher heat.

It will be understood that my invention is not limited to the particular form of heating unit shown and that any suitable form of either open or enclosed heating unit may be substituted therefor.

Having thus described my invention and the advantages thereof, I do not wish to be limited to the details herein disclosed, otherwise than as set forth in the claims, but what I claim is:—

1. In a washing machine, a vertically disposed and substantially cylindrical receptacle in which the washing is performed, said receptacle having a bottom and having an outwardly convex rounded corner portion between the cylindrical side and said bottom, an electric heating unit mounted outside of and adjacent said convex surface, a cover plate secured to said receptacle at said corner portion and enclosing said heating unit, and a layer of heat-insulating material interposed between said cover plate and said unit.

2. In a washing machine, a vertically disposed and substantially cylindrical receptacle in which the washing is performed, said receptacle having a bottom and having an outwardly convex rounded corner portion between the cylindrical side and said bottom, an electric heating unit mounted outside of and adjacent said convex surface and comprising a plurality of heating elements, a cover plate secured to said receptacle at said corner portion and enclosing said heating unit, a layer of heat-insulating material interposed between said cover plate and said unit, and means to render selected heating elements operative.

3. In a washing machine, a vertically disposed and substantially cylindrical receptacle in which the washing is performed, said receptacle having a bottom and having an outwardly convex rounded corner portion between the cylindrical side and said bottom, an electric heating unit adjacent said convex surface, a cover plate secured to said receptacle at said corner portion and enclosing said heating unit, and a layer of heat-insulating material interposed between said cover plate and said unit.

4. In a washing machine, a vertically disposed and substantially cylindrical receptacle in which the washing is performed, said receptacle having a bottom and having an outwardly convex rounded corner portion between the cylindrical side and said bottom, an electric heating unit adjacent said convex surface and comprising a plurality of heating elements, a cover plate secured to said receptacle at said corner portion and enclosing said heating unit, a layer of heat-insulating material interposed between said cover plate and said unit, and means to render selected heating elements operative.

ANNA F. BERGQUIST.